United States Patent
Padmanabhan

(10) Patent No.: US 11,752,681 B2
(45) Date of Patent: Sep. 12, 2023

(54) METHOD FOR PRODUCING FUSED UNPLASTICISED POLYVINYL CHLORIDE ARTICLES

(71) Applicant: STEER ENGINEERING PRIVATE LIMITED, Bengaluru (IN)

(72) Inventor: Babu Padmanabhan, Bengaluru (IN)

(73) Assignee: STEER ENGINEERING PRIVATE LIMITED, Bengaluru (IN)

(*) Notice: Subject to any disclaimer, the term of this patent is extended or adjusted under 35 U.S.C. 154(b) by 453 days.

(21) Appl. No.: 16/624,260

(22) PCT Filed: Jun. 20, 2018

(86) PCT No.: PCT/IB2018/054536
§ 371 (c)(1),
(2) Date: Dec. 18, 2019

(87) PCT Pub. No.: WO2018/235009
PCT Pub. Date: Dec. 27, 2018

(65) Prior Publication Data
US 2021/0146590 A1 May 20, 2021

(30) Foreign Application Priority Data
Jun. 22, 2017 (IN) .............................. 201741021946

(51) Int. Cl.
*B29C 48/405* (2019.01)
*B29C 48/00* (2019.01)
(Continued)

(52) U.S. Cl.
CPC .......... *B29C 48/405* (2019.02); *B29C 48/022* (2019.02); *B29C 48/09* (2019.02);
(Continued)

(58) Field of Classification Search
CPC ..... B29C 48/405; B29C 48/022; B29C 48/09; B29C 48/288; B29C 48/12; B29C 48/41;
(Continued)

(56) References Cited

U.S. PATENT DOCUMENTS 3,304,282 A 2/1967 Cadus et al.
4,300,839 A * 11/1981 Sakagami ............... B29B 7/802
366/85
(Continued)

FOREIGN PATENT DOCUMENTS

| CN | 101532591 | 9/2009 |
|---|---|---|
| CN | 203994608 | 12/2014 |

OTHER PUBLICATIONS

Covas, J. A. "Optimizing the processing of rigid PVC compounds." Journal of Vinyl Technology 13.3 (1991): 123-129. (Year: 1991).*
(Continued)

*Primary Examiner* — Galen H Hauth
(74) *Attorney, Agent, or Firm* — Klarquist Sparkman, LLP

(57) ABSTRACT

A method for producing a fused unplasticised polyvinyl chloride (UPVC) article (126) is provided. The method includes feeding an UPVC blend (103) into a co-rotating twin-screw extruder (100). The method further includes melting the UPVC blend (103) and conveying fused UPVC to an outlet (120) of the co-rotating twin-screw extruder (100). The method also includes collecting the fused UPVC from the outlet (120) at a rate of at least 100 kilograms/hour per litre of free volume (124) of the co-rotating twin-screw extruder (100).

10 Claims, 5 Drawing Sheets

(51) Int. Cl.
  *B29C 48/09* (2019.01)
  *B29C 48/285* (2019.01)
  *C08L 27/06* (2006.01)

(52) U.S. Cl.
  CPC ............ *B29C 48/288* (2019.02); *C08L 27/06* (2013.01); *B29C 2948/926* (2019.02); *B29C 2948/92104* (2019.02); *B29K 2827/06* (2013.01)

(58) Field of Classification Search
  CPC ..... B29C 2948/92104; B29C 2948/926; C08L 27/06; B29K 2827/06
  See application file for complete search history.

(56) References Cited

U.S. PATENT DOCUMENTS

| | | |
|---|---|---|
| 5,264,261 A | 11/1993 | Bush |
| 5,275,776 A | 1/1994 | Hara et al. |
| 5,358,680 A | 10/1994 | Boissonnat et al. |
| 6,186,769 B1 | 2/2001 | Hawley |
| 6,428,728 B1 | 8/2002 | Sakai et al. |
| 6,565,348 B1 | 5/2003 | Snijder et al. |
| 2006/0103045 A1 | 5/2006 | O'Brien-Bernini et al. |
| 2007/0007685 A1 | 1/2007 | Gleich et al. |
| 2009/0065965 A1 | 3/2009 | Bowen |
| 2016/0214277 A1 | 7/2016 | Saga et al. |
| 2016/0279828 A1 | 9/2016 | Padmanabhan |

OTHER PUBLICATIONS

Steer, "Steer Generation Next Co-Rotating Twin-Screw Extruders", Feb. 2016, https://web.archive.org/web/20160228082140/http://www.compoundingworld.com/steerdec (Year: 2016).*

International Search Report, received in PCT/IB2018/054536, dated Oct. 8, 2018, 3 pages.

Written Opinion, received in PCT/IB2018/054536 dated Oct. 8, 2018, 6 pages.

* cited by examiner

METHOD FOR PRODUCING FUSED UNPLASTICISED POLYVINYL CHLORIDE ARTICLES

CROSS REFERENCE TO RELATED APPLICATIONS

This is the U.S. National Stage of International Application No. PCT/IB2018/054536, filed Jun. 20, 2018, which was published in English under PCT Article 21(2), which in turn claims the benefit of India Application No. 201741021946, filed Jun. 22, 2017. Both applications are incorporated herein by reference in their entirety.

FIELD OF INVENTION

The present disclosure relates to a method for producing an unplasticised polyvinyl chloride (UPVC) article, and also relates to the UPVC article having reduced additives.

BACKGROUND

Articles, such as pipes, profiles, frames, etc., made from Unplasticised Polyvinyl Chloride (UPVC) have tremendous potential to replace similar articles that are made from other, conventionally available materials, such as steel, aluminium, and wood. UPVC based articles may be made from a raw UPVC form, commonly referred to as UPVC blend. However, manufacturing UPVC based articles is a tedious task as the UPVC blend is prone to degradation and deterioration during a manufacturing process. Therefore, a process of manufacturing UPVC based articles requires stabilizers that may inevitably increase an overhead cost associated with production of the UPVC based articles.

One way of producing UPVC based articles includes using an extrusion process (such as by use of single screw extruders or counter-rotating twin screw extruders). A typical extrusion process, carried out by use of counter-rotating twin screw extruders for the production of UPVC based articles, has a relatively low throughput. A low throughput in a large volume extruder makes the production viable only when long runs are possible. Additionally, such extruders are bulky, large sized, and difficult to service, and their operations are commonly plagued with high costs, relating to wear, and high energy consumption rates. Therefore, such production processes may be, or may soon become, among the less preferable methods of UPVC based article production.

SUMMARY

One aspect of the present disclosure relates to a method for producing a fused unplasticised polyvinyl chloride (UPVC) article. The method includes feeding an UPVC blend into a co-rotating twin-screw extruder. The method further includes melting the UPVC blend and conveying fused UPVC to an outlet of the co-rotating twin-screw extruder. The method also includes collecting a fused UPVC from the outlet at a rate of at least 100 kilograms/hour per litre of free volume of the co-rotating twin-screw extruder.

Another aspect of the present disclosure is directed to an article. The article is formed by a process that includes feeding an unplasticised polyvinyl chloride (UPVC) blend into a co-rotating twin-screw extruder, melting the UPVC blend and conveying fused UPVC to an outlet of the co-rotating twin-screw extruder, and collecting a fused UPVC from the outlet at a rate of at least 100 kilograms/hour per litre of free volume of the co-rotating twin-screw extruder.

DETAILED DESCRIPTION

Figure 1:
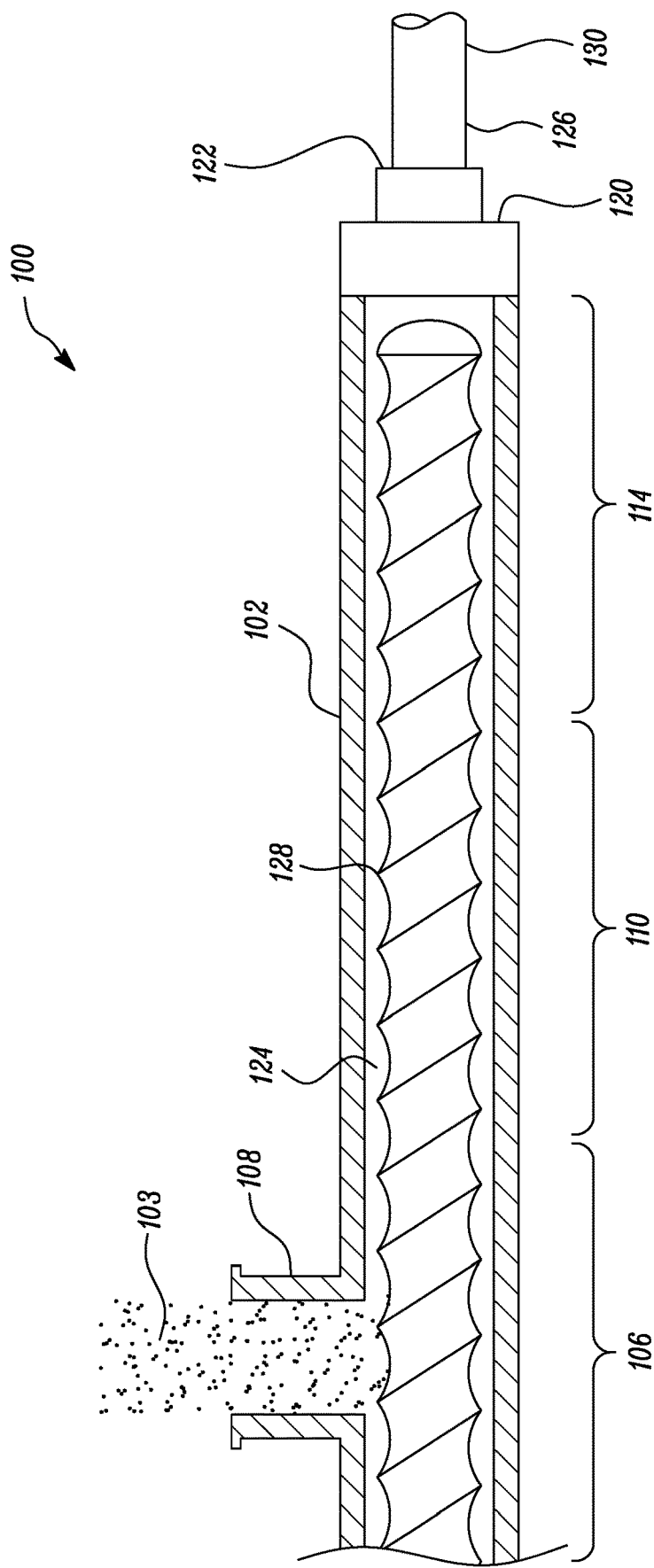
FIG. 1 is a diagrammatic view of a twin-screw processor system, in accordance with an embodiment of the present disclosure.
Figure 2:
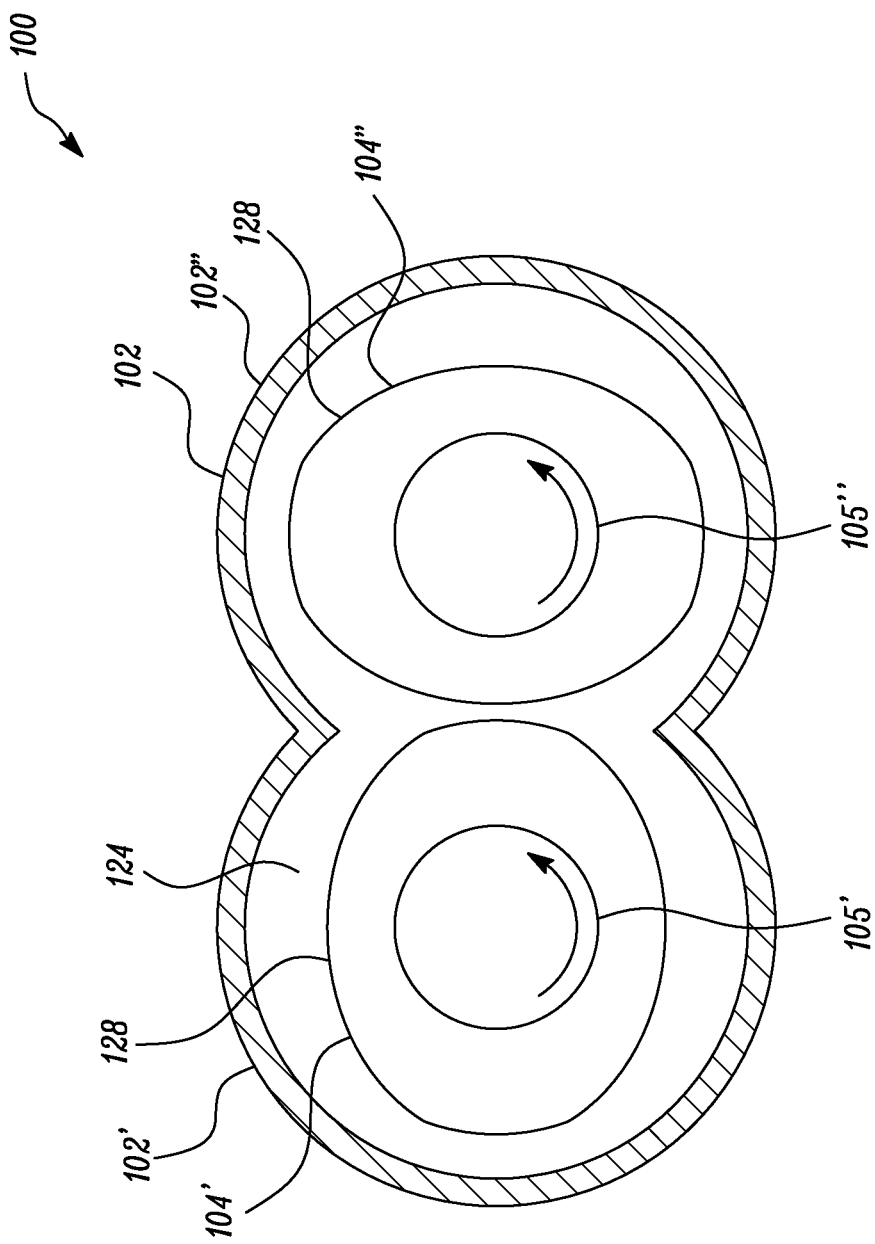
FIG. 2 is a diagrammatic front view of the twin-screw processor system.

Referring to FIGS. 1 and 2, diagrammatic views of a twin-screw processor system (100) is shown. The twin-screw processor system (100) is applied to prepare fused unplasticised polyvinyl chloride (UPVC) based articles, such as pipes, profiles, frames, etc., from an UPVC blend. The twin-screw processor system (100) includes a housing (102) having two cylindrical housing bores (102', 102"), also referred to as first and second housing bores (102', 102"). A first screw shaft (105') and a second screw shaft (105") are disposed in the first and second housing bores (102', 102"), respectively. One or more processing elements (104', 104") or 'elements (104', 104")', are mounted on the screw shafts (105', 105"), respectively. In an embodiment, elements (104', 104")' are integrally formed on the screw shafts (105', 105"), respectively, as opposed to multiple elements being mounted on a screw shaft. The elements (104', 104") may comprise a grooved axial bore in which splines of the screw shafts (105', 105") may be engaged.

Further, the twin-screw processor system (100) includes a feed zone (106) for receiving an UPVC blend (103) from a feeder (108), a blend fusing zone or a melting zone (110) for melting and/or fusing the UPVC blend (103), a discharge zone (114) for discharging the fused UPVC towards a discharge zone (114)—that further may convey the fused UPVC into a die (122).

The twin-screw processor system (100) may be (or may include) a co-rotating twin-screw extruder, and, thus, may be interchangeably referred to as a co-rotating twin-screw extruder (100). Therefore, the elements (104', 104") may be configured to rotate in the same rotary direction, facilitating a processing of the UPVC blend (103) that is fed into the co-rotating twin-screw extruder (100). In accordance with an embodiment, each of the elements (104', 104") is configured to operate up to a screw speed of at least 100 rotations per minute (rpm). Although it is possible that the elements (104', 104") operate at a screw speed of a lower or a higher rpm. In some implementations, the elements (104', 104") may run at least up to a screw speed of 300 rpm.

Further, the twin-screw processor system (100) may define a free volume (124) and a filled volume during operations. The free volume (124) may be total volume defined in entirety between the housing (102) of the twin-screw processor system (100) and elements (104', 104"), at any given point. The free volume (124) may be filled, at least in part, by a volume of the UPVC blend (103) (simply referred to as a filled volume) that is fed into the twin-screw processor system (100). By way of an example, the free volume (124) may be 1.6 litre, and a filled volume may be 1 litre. Nevertheless, variations to a specification of the free volume (124) and the filled volume may be contemplated.

The UPVC blend (103) may be fed from an UPVC source (not shown) to the feed zone (106) through the feeder (108). In one implementation, the UPVC blend (103) may be in powder form or granular form, and thus may be added to the feed zone (106) through a feeder, such as feeder (108), that is suited to transport materials in the powder form. In accordance with an embodiment, a temperature in the feed zone (106) may be in a range of 25° C. to 30° C.

The melting zone (110) is adapted to receive the UPVC blend (103) from the feed zone (106) owing to a continuous rotary action of the elements (104', 104"). In one embodiment, a rise in a temperature of the melting zone (110) is attained by fusing or melting the UPVC blend (103), as the UPVC blend (103) is sheared and kneaded by the elements (104', 104") and by generating frictional energy thereof. Additionally, or optionally, the melting zone (110) includes one or more heating elements (not shown) that may aid in maintaining a minimum temperature of the melting zone (110), and which also may help melt the UPVC blend (103) received from the feed zone (106). For example, the melting zone (110) may include at least a pair of melt forming elements (MFEs) (128) to melt the UPVC blend (103) and thereby form fused UPVC. The MFEs (128) may be designed to create turbulence in the melt flow without stagnation.

Figure 3:
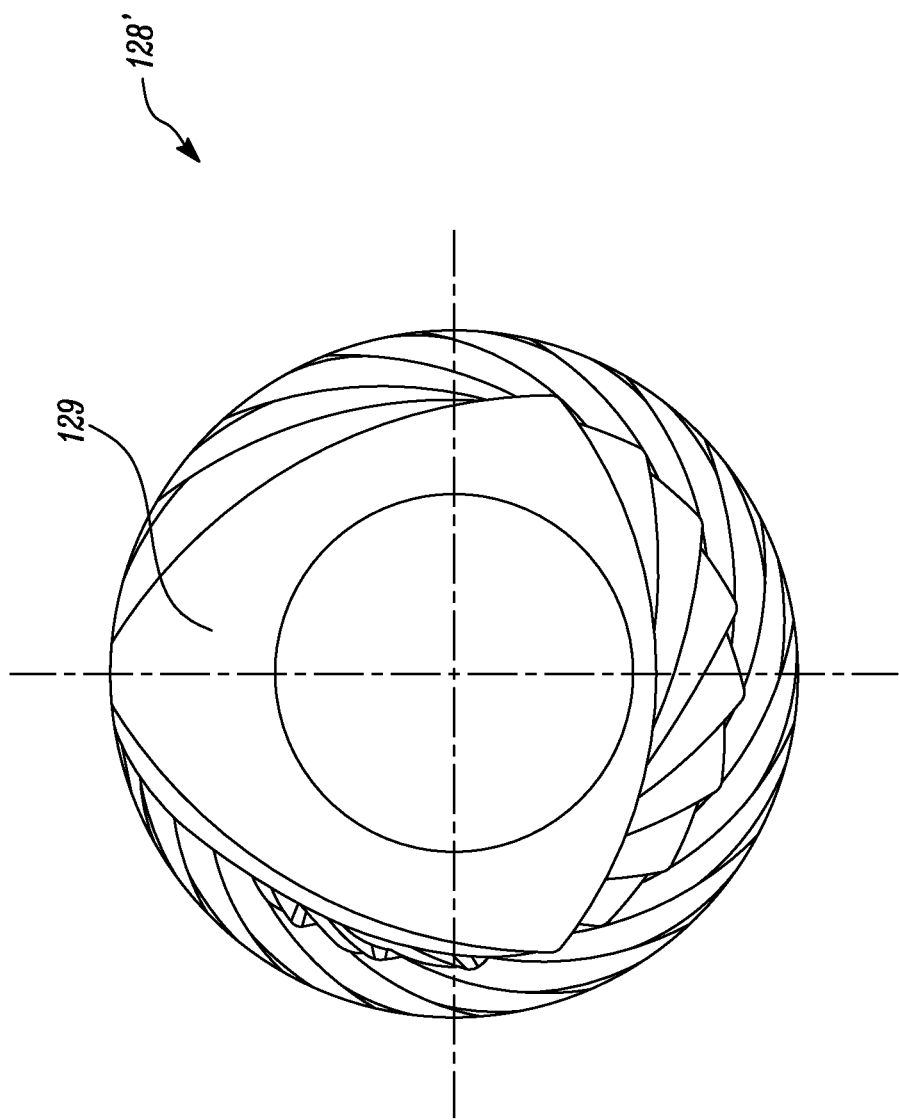
FIG. 3 is a front view of an exemplary melt forming element (MFE) of the twin-screw processor system, in accordance with an embodiment of the present disclosure.
Figure 4:
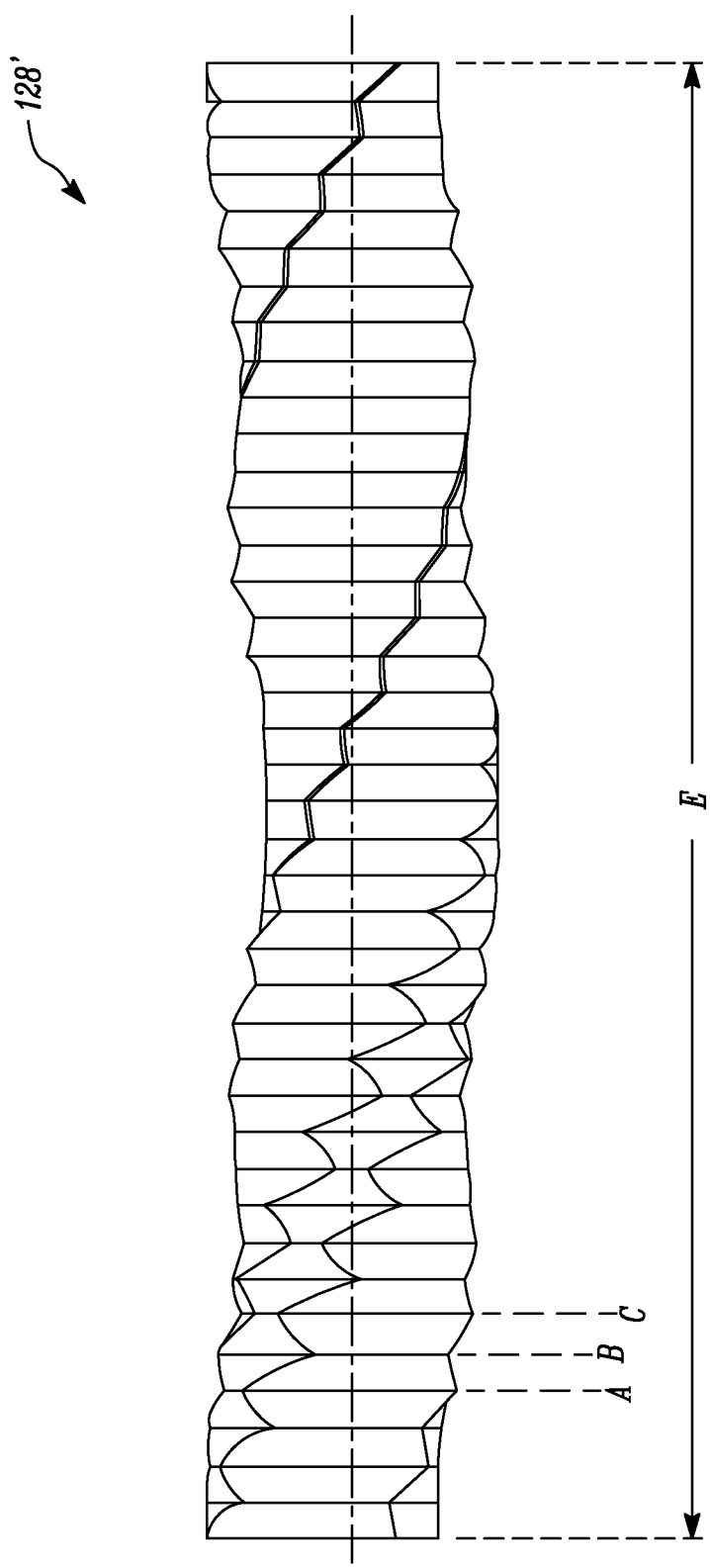
FIG. 4 is a side view of the MFE of FIG. 3.
Figure 5:
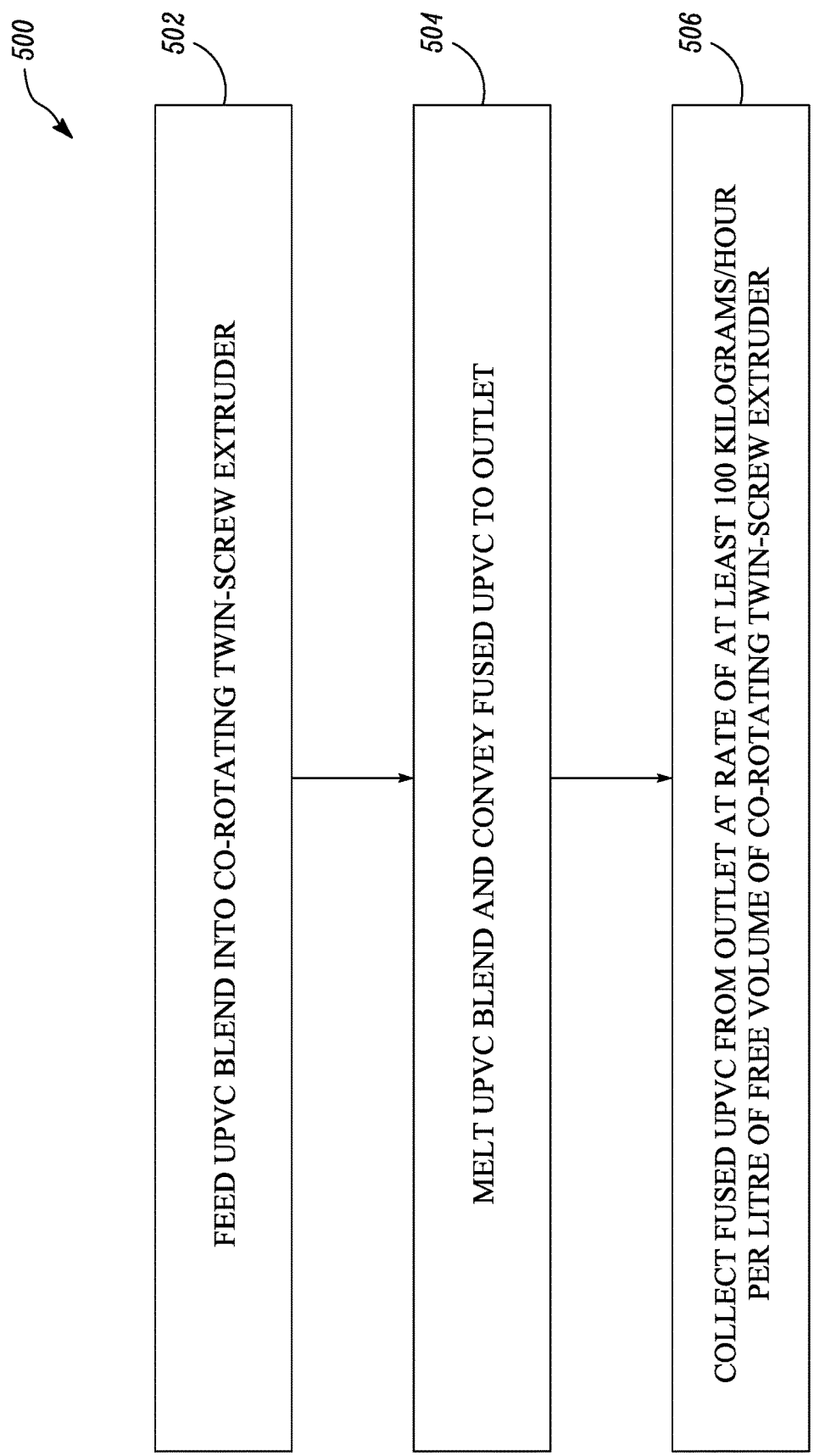
FIG. 5 is a flowchart illustrating a method of operation of the twin-screw processor system, in accordance with an embodiment of the present disclosure.

Referring to FIGS. 3 and 4, and by way of an example, an MFE (128') is depicted. The MFE (128') may represent one or more of the pair of MFEs (128), noted above. The MFE (128') may include a lead 'L' and may include at least one flight (129) (see FIG. 3) helically formed thereon. The flight (129) formed may be continuous without any breaks or interruptions. The flight (129) may transform at least once from a first non-integer lobe flight into a second non-integer lobe flight in a fraction of the lead 'L' and may transform back to the first non-integer lobe flight in a fraction of the lead 'L'.

In some embodiments, the MFE (128') may include a lead 'L' and at least one continuous flight helically formed thereon. In such a case, the flight may transform at least once from a first non-integer lobe flight into a second non-integer lobe flight in a fraction of the lead 'L', and may transform from the second non-integer lobe flight to a third non-integer lobe flight in a fraction of the lead 'L'. In some embodiments, a length, E, of the MFE (128') is equal to the lead 'L'. In some embodiments, the length of the MFE (128') may take any value from 150 millimeters to 200 millimeters.

With continued reference to FIG. 4, at a point A, a profile of the MFE (128') may include a first fractional lobe element. At a point B, the profile of the MFE (128') may include a second fractional lobe element. At a point C, the profile of the MFE (128') may again include the first fractional lobe element. The MFE (128') may transform from profile A to profile B to profile C. A transformation of the MFE (128') from profile A to profile B, may be within a fraction of the lead 'L', and the MFE (128') may transform from profile B to profile C within a fraction of the lead 'L'.

In an embodiment, the first non-integer lobe flight, the second non-integer lobe flight and the third non-integer lobe flight may be fractional lobe flights. The transformation from a first fractional lobe flight into second fractional lobe flight and back to first fractional lobe flight, or vice versa, may take place a plurality of times. In some embodiments, the first non-integer lobe flights for the plurality of transformations along the lead 'L' of the MFE (128') are the same. In other embodiments, the second non-integer lobe flights for the plurality of transformations along the lead 'L' of the MFE (128') are the same.

According to an embodiment, the MFE (128') starts from a first non-integer lobe flight, transforms into an integer lobe flight, and transforms back to the first non-integer lobe flight in a fraction of the lead 'L'. In some embodiments, the MFE (128') starts from a first integer lobe flight, transforms into a non-integer lobe flight, and transforms back to the first integer lobe flight in a fraction of the lead 'L'. In yet some embodiments, the MFE (128') starts from a first integer lobe flight, transforms into a second integer lobe flight, and transforms into a third integer lobe flight in a fraction of the lead 'L'.

In one example, a temperature of the melting zone (110) may be maintained between 150° C. and 175° C. to melt the UPVC blend (103). In other embodiments, a fused UPVC may reside and be maintained within the melting zone (110) for a period for proper melting. In one example, a residence time of the fused UPVC in the melting zone (110) may range between 3 to 4 seconds. For example, a residence time of the fused UPVC within the melting zone (110) may depend of certain factors. The factors may include a feed rate at which the UPVC blend (103) is fed into the feed zone (106), for example. Another factor may include a speed at which the twin-screw processor system (100) operates.

The discharge zone (114) is configured to receive a molten UPVC blend/fused UPVC from the melting zone (110) according to continuous rotary action of the elements (104', 104"). It may be noted that the discharge zone (114) may include a metering section that may be configured to transfer, without interruption, a constant volume of the fused UPVC towards an outlet (120) of the twin-screw processor system (100).

The die (122) may be placed at the outlet (120) of the twin-screw processor system (100) to extrude the fused UPVC and form an UPVC based article (126). The UPVC based article (126) is interchangeably referred to as "UPVC article (126)" or "article (126)". Such a placement of the die (122) may help a uniform extrudate of the fused UPVC blend exiting the die (122) take a particular form and dimension. For example, the die (122) may form the article (126) as a pipe (130) based on the fused UPVC. Nonetheless, the die (122) may also be configured to form various other types of articles. For example, the die (122) may form sheets, rods, bars, frames, channels, tubes, columns, coils, cables, etc. The article (126) may also embody other products that may be applied in a variety of applications known in the art. To this end, the die (122) may include a particular shape, and a passage through that particular shape may help the extrudate, (i.e. the fused UPVC) exiting the housing (102) via the outlet (120), take a characteristic form, thereby producing the article (126).

According to an aspect of the present disclosure, a method (and/or a process) for producing the UPVC article (126) is further described. This method is described by way of a flowchart 500 as shown in FIG. 3, and will be discussed below in conjunction with FIGS. 1 and 2. The method starts at step (502).

At step (502), an operator of the twin-screw processor system (100) facilitates a feeding of the UPVC blend (103) into the twin-screw processor system (100)—or into the feed zone (106)—through the feeder (108). It is however possible that the UPVC blend (103) is fed by multiple feeders. In some implementations, the UPVC blend (103) is fed at a feed rate between 50 and 250 kilograms/hour (kg/h) into the twin-screw processor system (100). In an embodiment, a feed rate may vary between 200 kg/h and 800 kg/h. In an embodiment, a specific mechanical energy index (SMEI) of the UPVC blend (103) is less than 0.12 kWh/kg. More specifically, and in yet another embodiment, a specific mechanical energy index (SMEI) of the UPVC blend (103) is less than 0.1 kWh/kg. In another embodiment, the UPVC blend (103) includes 0.5% to 3% portion of stabilizers and flow aids, such as waxes and stearates. By such feeding, the UPVC blend (103) enters the feed zone (106). The method proceeds to step (504).

At step (504), as the UPVC blend (103) is conveyed further to the melting zone (110), the melting zone (110) facilitates a melting of the UPVC blend (103) and forms fused UPVC. The molten UPVC blend and/or the fused UPVC is transferred/conveyed to the discharge zone (114) because of a continuous operation of the twin-screw processor system (100) (i.e. by a co-rotating motion of the elements (104', 104")). The method further includes conveying the fused UPVC into the discharge zone (114), and thereafter towards the outlet (120) of the twin-screw processor system (100). The method proceeds to step (506).

At step (506), the method includes collecting the fused UPVC from the outlet (120) of the twin-screw processor system (100). In particular, the fused UPVC may be collected at a specific throughput rate of at least 100 kilograms/hour/litre (kg/h/l) (output in kg/h per litre of the free volume (124) of the twin-screw processor system (100)). Furthermore, the fused UPVC may be collected through the die (122) as the UPVC article (126). The method ends at step (506).

In accordance with an aspect of the present disclosure, the article (126), formed by the method discussed above, may also embody an UPVC based product that is obtained by usage of reduced additives. Additives may include flow aids, stabilisers, etc. In particular, the percentage of additives applied in the article (126) (such as the final product) is less than 20% in relation to the UPVC blend (103). In another embodiment, the percentage of additives used may take a value within a range of 1% to 10%. Later in the description, there is included a representation of data (see Table 3, Table 4, and Table 5) from a series of trials that were performed, and which relate to an article produced by the method noted above, and in which incrementally reduced additives were added.

INDUSTRIAL APPLICABILITY

The disclosed process enables preparation of fused unplasticised polyvinyl chloride (UPVC) articles in a simple, efficient, and cost effective manner. The process disclosed allows the processing of highly sensitive and degradable UPVC by use of the MFEs (128) in a twin-screw processor system, and by operating the twin-screw processor system (100), as has been discussed by way of the flowchart 500 above, i.e. by retrieving the fused UPVC extrudate at the rate of at least 100 (kg/h/l) as specific throughput measured by output in kg/h per litre of free volume (124) of the twin-screw processor system (100), an article (e.g., article (126), such as the pipe (130)) made from the fused UPVC is formed.

According to an application of the present disclosure, the use of processing aids and flow aids in the extrusion processes may be mitigated, or altogether omitted, by use of the MFEs (128) noted above. Also, there is a reduction in an overall cost and/or effort involved in the process. Moreover, by maintaining other parameters of the twin-screw processor system (100) (examples noted in tabulations below), a specific throughput rate of above 100 (kg/h/l) (specific throughput measured by output per litre of free volume (124)) of the twin-screw processor system (100) is attained at the outlet 120. This enhances productivity of the twin-screw processor system (100), lessening costs of operations, and ensuring production viability.

The description further below includes data that was determined by conducting a series of trials by feeding the UPVC blend, such as UPVC blend (103), into a model Omega 40™ of a co-rotating twin-screw extruder, manufactured by Steer Engineering Private Limited. The model Omega 40™ includes the following specification—diameter of each screw element: 40 mm; Screw speed: 600 rpm; Length/Diameter ratio: 40; free volume: 1.6 litre. Further, the UPVC blend used in this trial includes the following specification—polyvinyl chloride (PVC): 100 kg; Stabilizer pack: 2.4 Kg; Stearic Acid (SA): 0.2 kg; Polyethylene Wax (PE Wax): 0.2 kg; Titanium Dioxide ($TiO_2$): 0.4 kg; Calcium Carbonate ($CaCO_3$): 8 kg.

For the purpose of the present disclosure, two tabulations are provided, namely Table 1 and Table 2 further below that represent two separate trials. Table 1 and Table 2 list out exemplary values of different parameters of the twin-screw processor system (100) that were maintained during the two trials. Notably, each of the trials depicted by way of Table 1 and Table 2 pertain to the production of an article (such as article (126), such as the pipe (130)) according to the aspects of the present disclosure, and were performed by collecting the fused UPVC from the outlet 120 at a specific throughput rate of at least 100 (kg/h/l) (output in kg/h per litre of free volume (124) of the twin-screw processor system (100)).

Table 1, for example, depicts certain parameters with which the extruder Omega 40™ was run to obtain a specific throughput of 260 (kg/h/l) using extruder Omega 40™ Table 1 is reproduced below:

| Parameter | Result |
| --- | --- |
| Screw Speed | 600 rpm |
| SMEI | 0.075 kWh/kg |
| Power Consumed | 30.53 kW |
| Melt Temperature of UPVC blend | 180° C.-190° C. |
| Melt Pressure of UPVC blend | 77 bar |

Table 2, for example, depicts a variation in certain parameters relative to Table 1, with which the extruder Omega 40™ was run to obtain a specific throughput of 375 (kg/h/l) using extruder Omega 40™, for the same UPVC blend. Table 2 is reproduced below:

| Parameter | Result |
| --- | --- |
| Screw Speed | 500 rpm |
| SMEI | 0.08 kWh/kg |
| Power Consumed | 49.5 kW |
| Melt Temperature of UPVC blend | 214° C. |
| Melt Pressure of UPVC blend | 6 bar |

As noted above, the forthcoming disclosure includes a representation of data of three trials that pertain to the amount of additives that were added, in addition to the UPVC blend, to form an article, such as article (126), according to the present disclosure. In particular, in the three trials, a quantity of the additives were incrementally varied (for example, incrementally lessened) in relation to the UPVC blend. Tabulations of the three trials are disclosed below.

Table 3, for example, depicts certain parameters with which the extruder Omega 40™ was run to obtain an article, such as article (126), that included an additive percentage of 2% in relation to the UPVC blend. By following the parameters of Table 3, a specific throughput of 260 kg/h/l was obtained. Table 3 is reproduced below:

| Parameter | Result |
| --- | --- |
| Power Consumed | 30.53 kW |
| Melt Pressure of UPVC blend | 77 bar |
| SMEI | 0.071 kWh/kg |
| Screw Speed | 600 rpm |

Table 4, for example, depicts certain parameters with which the extruder Omega 40™ was run to obtain an article, such as article (126), that included an additive percentage of 1.5% in relation to the UPVC blend. By following the parameters of Table 4, a specific throughput of 260 kg/h/l was obtained. Table 4 is reproduced below:

| Parameter | Result |
| --- | --- |
| Power consumed | 31.55 kW |
| Melt Pressure of UPVC blend | 79 bar |
| SMEI | 0.075 kWh/kg |
| Screw Speed | 607 rpm |

Table 5, for example, depicts certain parameters with which the extruder Omega 40™ was run to obtain an article, such as article (126), that included an additive percentage of 1.25% in relation to the UPVC blend. By following the parameters of Table 5, a specific throughput of 260 kg/h/l was obtained. Table 5 is reproduced below:

| Parameter | Result |
| --- | --- |
| Power Consumed | 33.09 kW |
| Melt Pressure of UPVC blend | 74 bar |
| SMEI | 0.079 kWh/kg |
| Screw Speed | 607 rpm |

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalent.

I claim:

1. A method for producing a fused unplasticised polyvinyl chloride (UPVC) article (126), the method comprising:
   a) feeding an UPVC blend (103) into a co-rotating twin-screw extruder (100);
   b) melting the UPVC blend (103) and conveying fused UPVC to an outlet (120) of the co-rotating twin-screw extruder (100), wherein the co-rotating twin-screw extruder (100) includes at least a pair of melt forming elements (MFEs) (128) to melt the UPVC blend (103), and at least one MFE (128') of the at least a pair of MFEs (128) includes a lead 'L' and includes at least one flight (129) helically formed thereon, the at least one flight (129) being continuous, and transforms at least once from a first non-integer lobe flight into a second non-integer lobe flight in a first longitudinal fraction of the lead 'L' and transforms back to the first non-integer lobe flight in a second longitudinal fraction of the lead 'L'; and
   c) collecting the fused UPVC from the outlet (120) at a rate of at least 100 kilograms/hour per litre of free volume (124) of the co-rotating twin-screw extruder (100).

2. The method as claimed in claim 1 further comprising placing a die (122) at the outlet (120) of the co-rotating twin-screw extruder (100) to extrude the fused UPVC and form the UPVC article (126).

3. The method as claimed in claim 1, wherein the co-rotating twin-screw extruder (100) includes a free volume (124) of 1.6 litre.

4. The method as claimed in claim 1, wherein the co-rotating twin-screw extruder (100) runs at least up to a screw speed of 300 rotations per minute (rpm).

5. The method as claimed in claim 1, wherein the UPVC blend (103) is fed at a feed rate between 50 and 250 kilograms/hour (kg/h) into the co-rotating twin-screw extruder (100).

6. The method as claimed in claim 1, wherein a specific mechanical energy index (SMEI) of the UPVC blend (103) is less than 0.12 kWh/kg.

7. The method as claimed in claim 1, wherein the UPVC blend (103) is in powder form.

8. The method as claimed in claim 1, wherein the UPVC blend (103) comprises 0.5% to 3% portion of one or more flow aids.

9. The method as claimed in claim 1, wherein the UPVC blend (103) is fed by one or more feeders.

10. The method as claimed in claim 1, wherein the co-rotating twin-screw extruder (100) runs at a screw speed of at least 100 rotations per minute (rpm).

* * * * *